United States Patent
Tomura et al.

(10) Patent No.: US 8,697,774 B2
(45) Date of Patent: Apr. 15, 2014

(54) INK FOR INK JET RECORDING AND INK SET FOR INK JET RECORDING

(75) Inventors: Kazumasa Tomura, Kodaira (JP); Akira Mizutana, Shiojiri (JP); Shinichi Yamamoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 107 days.

(21) Appl. No.: 13/414,172

(22) Filed: Mar. 7, 2012

(65) Prior Publication Data

US 2012/0232203 A1  Sep. 13, 2012

(30) Foreign Application Priority Data

Mar. 7, 2011  (JP) ................................. 2011-049497

(51) Int. Cl.
*C09D 11/10* (2006.01)

(52) U.S. Cl.
USPC ..... 523/160; 524/386; 106/31.58; 106/31.86; 347/100

(58) Field of Classification Search
USPC ............. 524/386; 106/31.58, 31.86; 523/160; 347/100
See application file for complete search history.

(56) References Cited

U.S. PATENT DOCUMENTS

| | | |
|---|---|---|
| 2003/0171481 A1 | 9/2003 | Toyoda |
| 2007/0242119 A1 | 10/2007 | Koganehira et al. |
| 2007/0247504 A1 | 10/2007 | Koganehira et al. |
| 2008/0213548 A1 | 9/2008 | Koganehira et al. |
| 2009/0176071 A1 | 7/2009 | Koganehira et al. |
| 2009/0308279 A1 | 12/2009 | Koganehira et al. |
| 2010/0010121 A1 | 1/2010 | Koganehira et al. |
| 2010/0080962 A1 | 4/2010 | Koganehira et al. |
| 2010/0086685 A1 | 4/2010 | Mizutani et al. |
| 2010/0289848 A1 | 11/2010 | Koganehira et al. |

FOREIGN PATENT DOCUMENTS

| | | |
|---|---|---|
| EP | 1077238 A1 | 2/2001 |
| JP | 2001-123098 A | 5/2001 |
| JP | 2003-201436 A | 7/2003 |
| JP | 2006-096933 A | 4/2006 |
| JP | 2007-277342 A | 10/2007 |
| JP | 2007-277356 A | 10/2007 |
| JP | 2008-184483 A | 8/2008 |
| JP | 2009-209338 A | 9/2009 |
| JP | 2009-209339 A | 9/2009 |
| JP | 2009-209340 A | 9/2009 |
| JP | 2009-286998 A | 12/2009 |
| JP | 2010-007054 A | 1/2010 |
| WO | 2010-038436 A1 | 4/2010 |

*Primary Examiner* — Vu A Nguyen
(74) *Attorney, Agent, or Firm* — Nutter McClennen & Fish LLP

(57) ABSTRACT

The ink for ink jet recording includes a sparingly water-soluble alkanediol, a resin, and a coloring material, wherein the content of the coloring material is from 1 to 3% by mass based on the total mass of the ink, the surface tension is from 21 to 25 mN/m, and the thixotropic index (TI) represented by the following formula (1), as determined at a time point when its content becomes 40% by mass based on the total mass before the evaporation of the ink by the evaporation of the ink, is from 2 to 110:

$$TI=\eta(1\ s^{-1})/\eta(1000\ s^{-1}) \qquad (1).$$

8 Claims, No Drawings

INK FOR INK JET RECORDING AND INK SET FOR INK JET RECORDING

The entire disclosure of Japanese Application No.: 2011-049497 filed on Mar. 7, 2011 is expressly incorporated by reference herein.

BACKGROUND

1. Technical Field

The present invention relates to an ink for ink jet recording and an ink set for ink jet recording.

2. Related Art

Ink jet recording methods are printing methods in which printing is performed by causing small ink droplets to fly through the air and causing these droplets to adhere to a recording medium such as paper and the like. Due to recent innovative advancement in ink jet recording technologies, ink jet recording methods are being increasingly employed in the fields of high-definition printing that have been realized only by silver halide photography and off-set printing heretofore. With this advancement, inks for ink jet recording have been developed, which can produce images having glossiness comparable to silver halide photography by ink jet recording using highly glossy recording media, that is, exclusive paper, comparable to developing paper, art paper, or the like that have been used in the fields of silver halide photos and off-set printing. Moreover, inks for ink jet recording that can achieve image quality comparable to silver halide photos even when plain paper is used have been developed.

Furthermore, pale inks of light cyan, light magenta, or the like have been recently attracting attention in order to obtain an image that exhibits gradation of color more naturally and clearly.

By way of one example, JP-A-2001-123098 discloses an ink composition for ink jet recording, including at least a water-based dispersion of a pigment, polymer fine particles, a water-soluble organic solvent, and water, wherein the water-based dispersion of a pigment includes a polymerizable surfactant having both non-ionic hydrophilicity and anionic hydrophilicity, and a polymer composed of monomers.

By way of another example, JP-A-2006-96933 discloses an ink jet ink including at least a pigment, a polymer compound A, and a polymer compound B, wherein the polymer compound A is an amphiphilic polymer compound, and the polymer compound B is a polymer compound having a glass transition point (Tg) of −30° C. or higher and 60° C. or lower.

By way of still another example, JP-A-2009-209338 discloses an ink composition for ink jet recording including at least a colorant, water, an alcohol solvent, and a surfactant, wherein the alcohol solvent includes a sparingly water-soluble alkanediol, a water-soluble 1,2-alkanediol, and a dialkylene glycol.

However, the technology described in any of JP-A-2001-123098, JP-A-2006-96933, and JP-A-2009-209338, when it is applied as a pale ink, has deterioration or needs improvement in terms of at least one of clogging recoverability, and occurrence of bleeding and beading.

SUMMARY

An advantage of some aspects of the invention is to provide an ink for ink jet recording which has excellent clogging recoverability and can suppress occurrence of bleeding and beading.

The present inventors have conducted investigation in order to solve the above-described problems. As a result, they have obtained the following knowledge. First, they have found that in the case where an ink including a sparingly water-soluble alkanediol and a resin is used for ink jet recording, the ink is dynamic and has a relatively high viscosity while being discharging, and the ink is static and has a relatively low viscosity while landing and adhering onto a recording medium. They have also found that even when the ink has a low initial viscosity, by progress of evaporation of the ink on the recording medium, that is, volatilization of the volatile components, a pseudoplastic fluid (which will be described later) is exhibited early, and thus, occurrence of blurring or bleeding (which will be described later) is suppressed effectively. By suppressing the initial viscosity to be low, clogging recoverability can be improved.

Moreover, particularly with a pale ink having a coloring material concentration of 1 to 3% by mass, by incorporating a sparingly water-soluble alkanediol and a resin therein and controlling its thixotropic index (TI) within a predetermined range, it is possible to increase the viscosity and exhibit a pseudoplastic fluid (which will be described later). From this, it could be found that occurrence of blurring or bleeding of a pale ink can be suppressed effectively.

Furthermore, it has been found that beading (which will be described later) and bleeding of the ink occurring in the case of recording on a recording medium (in particular, a low-absorbing recording medium) may be effectively controlled by decreasing the surface tension of the ink and suppressing the flowability after adherence onto the recording medium, that is, exhibiting the pseudoplastic fluid on the recording medium. Specifically, by controlling the surface tension and the thixotropic index (TI) of the ink within the predetermined range, such an effect can be attained.

From the knowledge above, the present inventors have found that clogging recoverability is excellent and occurrence of bleeding and beading can be suppressed with an ink for ink jet recording, which includes a sparingly water-soluble alkanediol, a resin, and a coloring material having a predetermined concentration, wherein the surface tension is from 21 to 25 mN/m, and the thixotropic index (TI) represented by the following formula (1), as determined at a time point when its content becomes 40% by mass based on the total mass before the evaporation of the ink by the evaporation of the ink, is from 2 to 110, thereby completing the present invention.

$$TI=\eta(1\ s^{-1})/\eta(1000\ s^{-1}) \tag{1}$$

That is, the present invention is as follows.

[1] An ink for ink jet recording including a sparingly water-soluble alkanediol, a resin, and a coloring material, wherein the content of the coloring material is from 1 to 3% by mass based on the total mass of the ink, the surface tension is from 21 to 25 mN/m, the solubility of the sparingly water-soluble alkanediol in water is less than 1.0 g/100 g of water, and the thixotropic index (TI) represented by the following formula (1), as determined at a time point when its content becomes 40% by mass based on the total mass before the evaporation of the ink by the evaporation of the ink, is from 2 to 110.

$$TI=\eta(1\ s^{-1})/\eta(1000\ s^{-1}) \tag{1}$$

[2] The ink for ink jet recording according to [1], wherein the thixotropic index is from 4 to 110.

[3] The ink for ink jet recording according to [1] or [2], wherein the resin is at least one of a polyolefin resin and a urethane resin.

[4] The ink for ink jet recording according to any one of [1] to [3], wherein the initial viscosity is 3 to 10 mPa·s.

[5] An ink set for ink jet recording including the ink for ink jet recording according to any one of [1] to [4], and an ink for ink jet recording containing a coloring material, wherein the content of the coloring material is from 5 to 7% by mass based on the total mass of the ink.

DESCRIPTION OF EXEMPLARY EMBODIMENTS

Embodiments for carrying out the present invention will be described in detail. Further, the present invention is not limited to the following embodiments, and can be carried out with various modifications made without departing from the gist of thereof.

In the present specification, the bleeding refers to such a state in which among the different colors, one color permeates and intermingle with another color adjacent thereto, and as a result, a blurring state occurs. The beading means local color density spots of similar colors produced by printing in monochrome, but does not mean that a portion not coated with ink remains on a recording medium surface. Further, the expression "when printing in monochrome" means, for example, when printing in monochrome on a 6-inch square (as a result, a single color is printed, and thus, the kinds of the inks developing the color may be plural).

In the specification, the thixotropic index (TI) represents a degree of thixotropy, as determined by taking a ratio of a static viscosity to a dynamic viscosity.

Specifically speaking, the thixotropic index is a value calculated by measuring two types of viscosity of the ink at a liquid temperature of 25° C. using a dynamic viscoelasticity measuring apparatus HAAKE MARS II (rheometer), that is, a viscosity at a shear rates of $1\ s^{-1}$ and a viscosity at a shear rate of $1000\ s^{-1}$, and introducing the viscosity values into a formula of "viscosity at a shear rate $1\ s^{-1}$ and a viscosity at a shear rate $1000\ s^{-1}$" (the formula (1) which will be described later). Further, in the specification, the thixotropy means thixotropy in a broad sense, and is also referred to as a pseudoplastic fluid. The pseudoplastic fluid is a phenomenon in which the pseudoplastic fluid exhibits high viscosity until a force is applied, when the viscosity decreases by an applied force of mixing and shaking the fluid.

In the specification, the alkanediol and the dialkylene glycol may be either linear or branched. Further, "water-soluble" means that the solubility in water (the amount of a solvate in 100 g of water) is 10.0 g or more, and "sparingly water-soluble" means that the solubility in water (the amount of a solvate in 100 g of water) is less than 1.0 g.

In the specification, the "(meth)acrylate" means at least any one of acrylate and methacrylate corresponding thereto, and the "(meth)acryl" means at least any one of acryl and methacryl corresponding thereto.

Ink for Ink Jet Recording

The ink for ink jet recording according to an embodiment of the present invention includes a sparingly water-soluble alkanediol, a resin, and a coloring material, wherein the content of the coloring material is from 1 to 3% by mass based on the total mass (100% by mass) of the ink, the surface tension is from 21 to 25 mN/m, and the thixotropic index (TI) represented by the following formula (1), as determined at a predetermined time point, is from 2 to 110:

$$TI=\eta(1\ s^{-1})/\eta(1000\ s^{-1}) \qquad (1).$$

Furthermore, in the specification, "the total mass of the ink" means the total mass (100% by mass) of the ink before the evaporation of the ink components, unless otherwise specified.

Here, the significance of TI in the present embodiment will be described. If the static viscosity is high when assuming ink droplets landed and adhered to a recording medium, movement of the ink droplets becomes difficult, and thus, occurrence of bleeding and beading becomes difficult.

Furthermore, if both of the static viscosity and the dynamic viscosity are high, it is difficult to carry out ink jetting. On the other hand, if both of the static viscosity and the dynamic viscosity are low, it is possible to carry out ink jetting stably even with a discharge frequency of 10 kHz or more, but for the reasons above, it becomes easy for bleeding and beading to occur.

Therefore, the present inventors have found that an ink for ink jet recording having low dynamic viscosity, which makes it possible to carry out ink jetting, and having a high static viscosity, which makes it hard to move in the state of adhering on a recording medium can solve the above-described problems. They have further found that by providing the thixotropic characteristics that are suitable for the ink for ink jet recording, that is, setting TI to the predetermined value range, the ink for ink jet recording as described above can be obtained.

Further, an ink droplet of approximately 1 to 100 pL has a larger surface area per unit area and correspondingly a higher drying rate than an ink droplet having a size in the mL to L order. As a consequence, it is necessary to regulate the preferable physical properties of the ink droplet for ink jet recording adhering on the recording medium in the state after being dried to some degree. Thus, in the present embodiment, TI as determined at a time point when the content of the ink becomes 40% by mass based on the total mass before the evaporation of the ink by the evaporation of the ink is employed.

Further, "TI as determined at a time point when the content of the ink becomes 40% by mass based on the total mass before the evaporation of the ink by the evaporation of the ink" may be referred to as a value measured when the ink evaporates (solvents or the like are volatilized) to 40% by mass based on the total mass (100% by mass) before the evaporation of the ink.

Additives (Components) that are included or may be included in the ink for ink jet recording (which may also be simply referred to as the "ink") will be described.

Coloring Material

The ink of the present embodiment includes a coloring material. As the coloring material, at least any one of a pigment and a dye may be used.

Pigment

In the present embodiment, the light resistance of the ink can be improved by using a pigment as the coloring material. As the pigment, any one of an inorganic pigment and an organic pigment may be used.

As the inorganic pigment, carbons such as furnace black, lamp black (C. I. Pigment Black 6), acetylene black, channel black, carbon black (C. I. Pigment Black 7), and the like, iron oxide, or titanium oxide can be used. Further, examples of the commercially available product of the titanium oxide include CR60-2 (trade name, manufactured by Ishihara Sangyo Kaisha, Ltd.).

Examples of the organic pigment include azo pigments such as an insoluble azo pigment, a condensed azo pigment, an azo lake, a chelate azo pigment, and the like, polycyclic pigments such as a phthalocyanine pigment, a perylene pigment, a perynone pigment, an anthraquinone pigment, a quinacridone pigment, and the like, dye chelates (for example, a basic dye type chelate and an acidic dye type chelate), a dye lake (for example, a basic dye type lake and an acidic dye type lake), nitro pigments, nitroso pigments, aniline black (C. I. Pigment Black 1), and daylight fluorescent pigments.

More specifically, examples of the carbon black used as the black ink include No. 2300, No. 900, MCF88, No. 33, No. 40, No. 45, No. 52, MA7, MA8, MA100, No. 2200B, and the like (all manufactured by Mitsubishi Chemical Corporation), Raven 5750, Raven 5250, Raven 5000, Raven 3500, Raven 1255, Raven 700, and the like (all manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (manufactured by Cabot Japan K. K.), Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (all manufactured by Degussa).

Examples of the pigment used for a white ink include C. I. Pigment White 6, 18, and 21.

Examples of the pigment used for a yellow ink include C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of the pigment used for a magenta ink include C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, or C. I. Pigment Violet 19, 23, 32, 33, 36, 38, 43, and 50.

Examples of the pigment used for a cyan ink include C. I. Pigment Blue 1, 2, 3, 15, 15:1, 15:2, 15:3, 15:34, 15:4, 16, 18, 22, 25, 60, 65, and 66, or C. I. Vat Blue 4 and 60.

Furthermore, examples of the pigment other than the magenta, cyan, and yellow pigments include C. I. Pigment Green 7 and 10, C. I. Pigment Brown 3, 5, 25, and 26, and C. I. Pigment Orange 1, 2, 5, 7, 13, 14, 15, 16, 24, 34, 36, 38, 40, 43, and 63.

These pigments may be used singly or in combination of two or more kinds thereof.

In the case of using the above-described pigment, the average particle diameter thereof is preferably 300 nm or less, and more preferably from 50 to 250 nm. If the average particle diameter is within this range, reliability of the ink, such as discharging stability, dispersion stability, and the like is superior, and an image having an excellent image quality can be formed. Here, the average particle diameter in the specification means a particle diameter at a cumulative 50% diameter based on 100% of the total volume of the population of particles, and can be measured with, for example, Photal PAR-III (manufactured by Otsuka Electronics Co., Ltd.).

Dye

In the present embodiment, a dye can be used as the coloring material. There are no particular limitations on the type of dye, and thus, acidic dyes, direct dyes, reactive dyes, or basic dyes can be used. Examples of the dye include C. I. Acid Yellow 17, 23, 42, 44, 79, and 142, C. I. Acid Red 52, 80, 82, 249, 254, and 289, C. I. Acid Blue 9, 45, and 249, C. I. Acid Black 1, 2, 24, and 94, C. I. Food Black 1 and 2, C. I. Direct Yellow 1, 12, 24, 33, 50, 55, 58, 86, 132, 142, 144, and 173, C. I. Direct Red 1, 4, 9, 80, 81, 225, and 227, C. I. Direct Blue 1, 2, 15, 71, 86, 87, 98, 165, 199, and 202, C. I. Direct Black 19, 38, 51, 71, 154, 168, 171, and 195, C. I. Reactive Red 14, 32, 55, 79, and 249, and C. I. Reactive Black 3, 4, and 35.

The dye may be used singly or in combination of two or more kinds thereof.

The content of the coloring material is in the range of 1 to 3% by mass, and preferably in the range of 1 to 2% by mass, based on the total mass (100% by mass) of the ink, from the viewpoints that the ink of the present embodiment is the pale ink as described above.

Sparingly Water-Soluble Alkanediol

The ink of the present embodiment includes a sparingly water-soluble alkanediol.

As the sparingly water-soluble alkanediol, an alkanediol having 7 or more carbon atoms is preferred, and an alkanediol having 7 to 10 carbon atoms is more preferred. Among the alkanediols having 7 to 10 carbon atoms, a sparingly water-soluble 1,2-alkanediol is even more preferred, and in this case, the surface tension of the ink can be reduced, and thus, occurrence of beading can be suppressed more effectively. Examples of the sparingly water-soluble 1,2-alkanediol include, but are not limited to, 1,2-heptanediol, 1,2-octanediol, 5-methyl-1,2-hexanediol, 4-methyl-1,2-hexanediol, and 4,4-dimethyl-1,2-pentanediol. Among these, from the viewpoint of suppressing the occurrence of beading more effectively, 1,2-octanediol is particularly preferable.

The content of the sparingly water-soluble alkanediol is preferably from 1.0 to 5.0% by mass, more preferably from 1.5 to 4.0% by mass, and even more preferably from 2.0 to 3.5% by mass, based on the total mass (100% by mass) of the ink. If the amount of the sparingly water-soluble alkanediol is within the above-described range, occurrence of bleeding and beading of the ink can be suppressed, and thus, an image having a high image quality can be attained. In addition, the initial viscosity of the ink does not increase too much, and in a usual preservation state of the ink, an oil layer can be prevented effectively from being separated, and thus, the preservability and the clogging recoverability of the ink are improved.

Water-Soluble Alkanediol

The ink of the present embodiment may include a water-soluble alkanediol, which is advantageous in that occurrence of bleeding of an aqueous solution including materials other than the solids contained in the ink, that is, solvents, can be further suppressed.

The water-soluble alkanediol included in the ink of the present embodiment may be a one-end or both-end alkanediol. As the water-soluble alkanediol, an alkanediol having 3 or more carbon atoms is preferred, and an alkanediol having 3 to 6 carbon atoms is more preferred. Preferable examples of the water-soluble alkanediol included in the ink of the present embodiment include water-soluble hexanediols such as 1,2-hexanediol, 1,6-hexanediol, and the like, 2-methyl-1,3-propanediol, and 3-methyl-1,5-pentanediol, and among these, 1,2-hexanediol or 3-methyl-1,5-pentanediol is preferred. Further, from the viewpoint of excellent discharging stability at a high frequency, 1,6-hexanediol is also available. Here, the both-end alkanediol means an alkanediol having hydroxyl groups on both ends in the main chain of the alkyl chain, and the one-end alkanediol means an alkanediol having hydroxyl groups on the other end in the main chain of the alkyl chain. Accordingly, for example, 1,6-hexanediol and 3-methyl-1,5-pentanediol belong to the both-end alkanediols, and 1,2-hexanediol belongs to the one-end alkanediols.

Further, the content ratio (by mass) of the sparingly water-soluble alkanediol to the water-soluble alkanediol is preferably in the range of 5:1 to 1:2. With the ratio in this range, occurrence of beading in the case where the landing time intervals are short can be suppressed.

Resin

The ink of the present embodiment includes a resin.

Preferable examples of the resin as described above include, but are not limited to, modified polyolefin emulsions such as an oxidized high-density polyethylene wax emulsion and the like, a urethane resin, a sulfonic ester resin, a polyolefin resin, a fluorene resin, and a styrene-acrylic acid resin. These resins are adsorbed on pigments, and thus, the dispersibility is rendered favorable. Among these, a high TI can be exhibited, and the initial viscosity can be reduced, and in this regard, at least any one of a polyolefin resin and a urethane resin is more preferred.

Furthermore, the resin as described above may be used singly or in combination of two or more kinds thereof.

Specific examples of the hydrophobic monomer in the resin include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethylhexyl acrylate, 2-ethylhexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxypropyl acrylate, 2-hydroxypropyl methacrylate, 2-dimethylaminoethyl acrylate, 2-dimethylaminoethyl methacrylate, 2-diethylaminoethyl acrylate, 2-diethylaminoethyl methacrylate, glycidyl acrylate, glycidyl methacrylate, allyl acrylate, allyl methacrylate, cyclohexyl acrylate, cyclohexyl methacrylate, phenyl acrylate, phenyl methacrylate, nonylphenyl acrylate, nonylphenyl methacrylate, benzyl acrylate, benzyl methacrylate, dicyclopentenyl acrylate, dicyclopentenyl methacrylate, bornyl acrylate, bornyl methacrylate, 1,3-butanediol diacrylate, 1,3-butanediol dimethacrylate, 1,4-butanediol diacrylate, 1,4-butanediol dimethacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, 1,6-hexanediol diacrylate, 1,6-hexanediol dimethacrylate, dipropylene glycol diacrylate, dipropylene glycol dimethacrylate, trimethylolpropane triacrylate, trimethylolpropane trimethacrylate, glycerol acrylate, glycerol methacrylate, styrene, methyl styrene, vinyltoluene, hydroxyethylated orthophenylphenol acrylate, and the like.

Furthermore, these may be used singly or in a mixture of two or more kinds thereof.

Specific examples of the hydrophilic monomer in the resin include acrylic acid, methacrylic acid, maleic acid, itaconic acid, and the like.

Furthermore, these may be used singly or in a mixture of two or more kinds thereof.

The resins that can be suitably used in the present embodiment will be described in detail below.

Modified Polyolefin Emulsion

By incorporating a modified polyolefin emulsion in the ink of the present embodiment, transfer to the back side when pieces of recorded matter are overlapped therebetween can be suppressed, and the scratch resistance of the recording surface is improved. Particularly, it is thought that the modified polyolefin emulsion has an action to soften the ink coating film, and when a pressure is applied to the recording surface, the ink coating film itself is crushed, the binding force of the components in the ink thus increases, and as a result, the scratch resistance is improved. A preferable modified polyolefin emulsion is a modified polyethylene emulsion and modified polypropylene emulsion, and more preferable examples thereof include an oxidized polyethylene emulsion, an oxidized polypropylene emulsion, a (anhydrous) maleic acid modified polyethylene emulsion, a (anhydrous) maleic acid modified polypropylene emulsion, and the like.

Furthermore, from the viewpoint of transfer suppression, the modified polyolefin emulsion is preferably produced by the modification of a polyolefin having a weight-average molecular weight (Mw) of 1,000 to 50,000. Further, as a method for modifying a polyolefin, an ordinary method can be used, and, for example, by modifying the polyolefin with an unsaturated carboxylic acid or an anhydride thereof, and then dispersing the modified product in water in the presence of a basic compound and an emulsifier, thereby obtaining a carboxylic acid modified polyolefin. Alternatively, the unsaturated carboxylic acid is preferably at least any one of maleic acid and maleic anhydride.

Examples of the modified polypropylene emulsion include one obtained by modifying a low-molecular-weight polypropylene by a known method, or the like, using a heating reaction or an organic peroxide. For example, a low-molecular-weight polypropylene is modified by heating and melting and grafting an unsaturated carboxylic acid or an anhydride thereof in the presence of an aromatic solvent or a chlorine solvent or in the presence of a peroxide radical generating catalyst in an inert gas atmosphere.

In addition, a commercial modified polyolefin emulsion can also be used. Although not being limitative, for example, AQUACER 515 (oxidized high-density polyethylene wax emulsion, particle diameter 100 to 200 nm, melting point 130° C., solid content 30%), AQUACER 507 (oxidized high-density polyethylene wax emulsion), AQUACER 526 (modified ethylene vinyl acetate wax emulsion), and AQUACER 593 (modified polypropylene wax emulsion) (all manufactured by BYK Chemie Japan, Inc.), Hiwax 2203A (anhydrous maleic acid modified polyethylene wax, manufactured by Mitsui Chemicals, Inc.), and Hytec E2213 (oxidized polyethylene wax emulsion, solid content 30%, trade name, manufactured by TOHO Chemical Co., Ltd.), each of which is prepared by modifying a low-molecular-weight polypropylene to a low-molecular-weight polyethylene can be preferably used.

Sulfonic Ester Resin

By incorporating a sulfonic ester resin in the ink of the present embodiment, glossy unevenness can be suppressed effectively in the case where the recording surface is abraded.

The sulfonic ester resin is preferably one obtained by subjecting an ethylenically unsaturated monomer to emulsion polymerization in the presence of a reactive emulsifier containing a hydrophilic group, a hydrophobic group, and a radically reactive group.

The incorporation of this resin can realize a recorded image that has glossiness comparable to that of silver halide photography as well as excellent fixability, light resistance, and gas resistance. The reason for this has not been fully elucidated yet, but is believed to reside in the following. However, it should be noted that the above reason is hypothetical and should not be construed as limitative. That is, by subjecting the ethylenically unsaturated monomer to emulsion polymerization in the presence of a reactive emulsifier, the amount of the free emulsifier remaining in a resin solution can be reduced, as compared with a case of using a free emulsifier exhibiting excessive surfactant ability while drying the ink. Consequently, the amount of the free emulsifier in the water-based ink is reduced. Further, since the reactive emulsifier has a hydrophilic group, the free reactive emulsifier and the dispersed resin are highly compatible with each other in the ink. Further, by adding a chain transfer agent during blending of various monomers, and then bringing it into contact with a polymerization initiator, lower-molecular-weight ones are attained. It is thought that for the reasons as described above, recorded images that have glossiness comparable to that of silver halide photography as well as excellent fixability, light resistance, and gas resistance, can be obtained.

The "reactive emulsifier" as used herein refers to an emulsifier that has an emulsifying capability good enough to cause emulsion polymerization and is radically polymerizable.

The reactive emulsifier is a compound including a hydrophilic group, a hydrophobic group, and a radically reactive group. Examples of the hydrophilic group include a sulfuric ester group, a carboxylic acid group, a polyoxyethylene group, and the like. Among these hydrophilic groups, one having at least any one of a sulfuric ester group and a polyoxyethylene group is preferred, and one having both of a sulfuric ester group and a polyoxyethylene group is more preferred.

For example, an aliphatic alkyl or aromatic group having 5 to 20 carbon atoms is preferred as the hydrophobic group constituting the reactive emulsifier. Among those, an aliphatic alkyl group having 8 to 15 carbon atoms is more preferred.

Further, examples of the radically reactive group constituting the reactive emulsifier include ethylenically unsaturated groups such as an acryl group, a methacryl group, an allyloxy group, a methallyloxy group, a propenyl group, and the like. Among these, at least any one of an allyloxy group and a propenyl group is preferred.

As a reactive emulsifier in which the hydrophilic group is an anionic functional group, specifically, Latemul S-180A (manufactured by Kao Corp.), Eleminol JS-2 (manufactured by Sanyo Chemical Industries, Ltd.), Aqualon KH-10, Aqualon HS-10, and Aqualon BC-10 (all manufactured by Dai-Ichi Kogyo Seiyaku Co., Ltd.), Adeka Reasoap SE-10N (manufactured by Asahi Denka Kogyo Ltd.), or the like can be preferably used. Further, a reactive emulsifier in which the hydrophilic group is a cationic functional group can be also preferably used. Further, as the reactive emulsifier in which the hydrophilic group is a nonionic functional group, Aqualon RS-20 (manufactured by Dai-Ichi Kogyo Seiyaku Co., Ltd.), Adeka Reasoap ER-20 (manufactured by Asahi Denka Kogyo Ltd.), or the like can be preferably used. The above-described reactive emulsifiers may be used singly or in a combination of two or more kinds thereof.

The content of the reactive emulsifier in the ink is preferably from 0.5 to 5 parts by mass, and more preferably from 0.5 to 3 parts by mass, based on 100 parts by mass of the ethylenically unsaturated monomer, although the content of the reactive emulsifier depends upon the particle diameter of the resin emulsion which will be described later. When the reactive emulsifier is contained in this content range, the emulsion polymerization can be stably carried out and the resin is sufficiently emulsified. Further, when the reactive emulsifier is added to the ink, a problem of foaming does not occur.

In the ink of the present embodiment, an anionic emulsifier, a nonionic emulsifier, a cationic emulsifier, a zwitterionic emulsifier, or a nonreactive emulsifier such as a water-soluble resin and the like may be added in addition to the above reactive emulsifier. The use of a combination of the reactive emulsifier with the nonreactive emulsifier can improve the storage stability of the emulsion.

Examples of the anionic emulsifier include alkali metal salts of higher alcohol sulfates, alkali metal salts of alkylbenzenesulfonic acids, alkali metal salts of succinic acid dialkyl ester sulfonic acids, alkali metal salts of alkyldiphenyletherdisulfonic acids, sulfate salts of polyoxyethylene alkyl ethers, sulfate salts of polyoxyethylene alkyl phenyl ethers, phosphate salts of polyoxyethylene alkyl ethers, phosphate salts of polyoxyethylene alkyl phenyl ethers, and the like.

Further, examples of the nonionic emulsifier include polyoxyethylene alkyl ethers, polyoxyethylene alkyl phenyl ethers, and alkyl ethers in which the hydrophilic group is a sugar chain, and the like.

Examples of the cationic emulsifier include alkyl pyridinyl chlorides, alkylammonium chlorides, and the like.

Examples of the zwitterionic emulsifier include lauryl betaine and the like.

Examples of the water-soluble resin include alkali neutralization products of polycarboxylic acid polymers produced by copolymerizing an aromatic monomer with a carboxyl group-containing monomer, polyvinyl alcohols, enzymatically degraded starch, and the like.

These nonreactive emulsifiers may be used singly or in combination of two or more kinds thereof.

The content of the nonreactive emulsifier included in the ink is preferably 5 parts by mass or less, based on 100 parts by mass of the ethylenically unsaturated monomer. When the water-soluble resin is used as the nonreactive emulsifier, the content of the nonreactive emulsifier is preferably 50 parts by mass or less, based on 100 parts by mass of the ethylenically unsaturated monomer.

The resin included in the ink of the present embodiment is produced by emulsion polymerization of an ethylenically unsaturated monomer in the presence of the above reactive emulsifier. The ethylenically unsaturated monomer to be used herein is not particularly limited, and examples thereof include diene monomers such as 1,3-butadiene, 1,2-butadiene, 1,2-pentadiene, 1,3-pentadiene, 2,3-pentadiene, isoprene, 1,2-hexadiene, 1,3-hexadiene, 1,4-hexandiene, 1,5-hexadiene, 2,3-hexadiene, 2,4-hexadiene, 2,3-dimethyl-1,3-butadiene, 2-ethyl-1,3-butadiene, 1,2-heptadiene, 1,3-heptadiene, 1,4-heptadiene, 1,5-heptadiene, 1,6-heptadiene, 2,3-heptadiene, 2,5-heptadiene, 3,4-heptadiene, 3,5-heptadiene, cyclopentadiene, dicyclopentadiene, and ethylidene norbornene; aromatic monomers such as styrene, α-methylstyrene, o-methylstyrene, p-methylstyrene, m-methylstyrene, vinylnaphthalene, divinylstyrene, and the like; alkyl(meth)acrylates such as methyl(meth)acrylate, ethyl(meth)acrylate, n-propyl(meth)acrylate, i-propyl(meth)acrylate, n-butyl(meth)acrylate, n-amyl(meth)acrylate, i-amyl(meth)acrylate, hexyl(meth)acrylate, 2-ethylhexyl(meth)acrylate, octyl(meth)acrylate, i-nonyl(meth)acrylate, decyl(meth)acrylate, hydroxymethyl(meth)acrylate, hydroxyethyl(meth)acrylate, and the like; unsaturated carboxylic acids such as itaconic acid, fumaric acid, (meth)acrylic acid, maleic acid, crotonic acid, and the like; ethylenically unsaturated carboxylic acid alkylamides such as (meth)acrylamide, N-methylolacrylamide, and the like; vinyl carboxylates such as vinyl acetate, vinyl propionate, and the like; aminoalkyl esters of ethylenically unsaturated carboxylic acids such as anhydrides of ethylenically unsaturated dicarboxylic acid monoalkyl esters, or monoamides, aminoethyl acrylate, dimethylaminoethyl acrylate, butylaminoethyl acrylate, and the like; ethylenically unsaturated carboxylic acid aminoalkylamides such as aminoethyl acrylamide, dimethylaminomethyl methacrylamide, methylaminopropylmethacrylamino, and the like; vinyl cyanide-based compounds such as (meth)acrylonitrile, α-chroloacrylonitrile, and the like; unsaturated aliphatic glycidyl esters such as glycidyl(meth)acrylate and the like; etc. These monomers may be used singly or in combination of two or more kinds thereof.

Among the above monomers, 1,3-butadiene, isoprene, styrene, and alkyl(meth)acrylates which are (meth)acrylic monomers such as methyl(meth)acrylate, ethyl(meth)acrylate, n-butyl(meth)acrylate, 2-ethylhexyl(meth)acrylate, and the like are preferred. Alkyl(meth)acrylates are particularly preferable.

Further, the above ethylenically unsaturated monomers may contain functional groups such as an alkoxysilane group, an epoxy group, a hydroxyl group, a polyethylene oxide group, and the like. The presence of such functional groups can improve compatibility of the resin with each component in the ink. Among these, an alkoxysilane group-containing monomer is preferably used.

Examples of the alkoxysilane group-containing monomer include γ-methacryloxypropyltriethoxysilane, γ-acryloxypropyltriethoxysilane, γ-methacryloxypropyltrimethoxysilane, γ-acryloxypropyltrimethoxysilane, vinyltriethoxysilane, and vinyltrimethoxysilane. Examples of the epoxy group-containing monomer include glycidyl(meth)acrylate.

Examples of the hydroxyl group-containing monomer include 2-hydroxyethyl methacrylate and the like. Further, examples of the polyethylene oxide group-containing monomer include polyethylene glycol monomethacrylate which is available as Blemmer PE200 (manufactured by Nippon Oils & Fats Co., Ltd.), and the like.

Preferably, the functional group-containing monomers are contained in an amount of 10% by weight or less, and more preferably 5% by weight or less in the monomers.

The resin is produced by subjecting the above-described ethylenically unsaturated monomer to emulsion polymerization in the presence of a reactive emulsifier including a hydrophilic group, a hydrophobic group, and a radically reactive group.

The emulsion polymerization is carried out by mixing 100 parts by mass of the ethylenically unsaturated monomers, 0.5 to 5 parts by mass of the reactive emulsifier, and 100 to 5,000 parts by mass of water together, adding an ethylenically unsaturated monomer and a radical polymerization initiator to the mixture, and allowing a reaction to proceed at a polymerization temperature of 5 to 100° C. for 0.1 to 10 hours. The polymerization temperature is preferably from 30 to 90° C., and the polymerization time is preferably from 2 to 5 hours.

As the radical polymerization agent, a redox initiator including a combination of an oxidizing agent containing an organic hydroperoxide such as cumene hydroperoxide, diisopropylbenzene peroxide, diisopropylbenzene hydroperoxide, and the like with a reducing agent of a sugar-containing pyrophosphoric acid/sulfoxylate mixture; persulfates such as potassium persulfate, ammonium persulfate, and the like; azo initiators such as azobisisobutyronitrile, dimethyl-2,2'-azobisisobutylate, 2-carbamoylazaisobutyronitrile, and the like; and organic peroxides such as benzoyl peroxide, lauroyl peroxide, and the like. Among these, organic peroxides are preferred.

Further, in the emulsion polymerization, if necessary, other emulsifiers, organic solvents, or the like may be used. The method for the addition of the ethylenically unsaturated monomer is not particularly limited and may be any of a batch addition method, a continuous addition method, a divided addition method, and the like.

In the present embodiment, it is preferable that the ethylenically unsaturated monomer be subjected to emulsion polymerization in the presence of a chain transfer agent in addition to the reactive emulsifier. The combined use of the reactive emulsifier and the chain transfer agent can realize a recorded image having superior glossiness, fixability, light resistance, and gas resistance. The reason for this has not been fully elucidated yet, but is believed to reside in that, in the emulsion polymerization, the chain transfer agent is bonded to the polymer end of the resin. However, it should be noted that the above mechanism is hypothetical and should not be construed as limiting the scope of the present embodiment.

Examples of the chain transfer agent include mercaptans such as octyl mercaptan, n-dodecyl mercaptan, t-dodecyl mercaptan, n-hexadecyl mercaptan, n-tetradecyl mercaptan, t-tetradecyl mercaptan, and the like; xanthogen disulfides such as dimethylxanthogen disulfide, diethylxanthogen disulfide, diisopropylxanthogen disulfide, and the like; thiuram disulfides such as tetramethylthiuram disulfide, tetraethylthiuram disulfide, tetrabutylthiuram disulfide, and the like; halogenated hydrocarbons such as carbon tetrachloride, ethylene bromide, and the like; hydrocarbons such as pentaphenylethane, 1,1-diphenylethylene, α-methylstyrene dimer, and the like; and other chain transfer agents such as acrolein, methacrolein, ally alcohol, 2-ethylhexylthioglycolate, terpinolene, α-terpinene, γ-terpinene, dipentene, and the like. Among these, mercaptans, xanthogen disulfides, thiuram disulfides, carbon tetrachloride, 1,1-diphenylethylene, α-methylstyrene dimer, or 2-ethylhexylthioglycolate is preferably used. The above chain transfer agents may be used singly or in combination of two or more kinds thereof.

The amount of the chain transfer agent to be added is preferably from 0.1 to 10 parts by mass, preferably from 0.2 to 7 parts by mass, more preferably from 0.2 to 5 parts by mass, and even more preferably from 0.3 to 3 parts by mass, based on 100 parts by mass of the total amount of the ethylenically unsaturated monomer and the reactive emulsifier. When the amount of the chain transfer agent to be added is in the above-described range, the glossiness of the recorded matter is further improved and the sufficient scratch resistance is provided.

The resin thus obtained is present in an emulsion form in the polymerization solution. In the ink according to the present invention, the resin is preferably present in an emulsion form in the ink (which is hereinafter also referred to as a resin emulsion). The average particle diameter of the resin emulsion is preferably from 10 to 100 nm, and more preferably from 30 to 60 nm. When the average particle diameter is more than 100 nm, the storage stability becomes unstable and the formation of a thin and even film by electrodeposition is difficult. Further, compatibility with each component in the ink is lowered. On the other hand, when the average particle diameter is less than 10 nm, the polymerization stability is significantly deteriorated. The average particle diameter can be adjusted by varying the type and mixing ratio of the monomer and the amount of the chain transfer agent and the emulsifier to be added.

The weight-average molecular weight of the sulfonic ester resin thus obtained is preferably from 10,000 to 100,000, and more preferably from 30,000 to 70,000. When the resin has a relatively low molecular weight, the emulsion is easily fused upon ink drying. The weight-average molecular weight of the resin can be adjusted, for example, by varying the type and addition amount of the polymerization initiator or by using a chain transfer agent.

Polyolefin Resin

By incorporating a polyolefin resin in the ink of the present embodiment, generation of damage on the recording surface can be suppressed and the fixability of the ink is further improved.

The polyolefin resin preferably has a larger particle diameter than the film thickness after drying of the film formed by the ink discharging and the ink landing on the recording surface. It is thought that by adherence of the particles protruding from the ink coating film onto the recording surface, when a pressure is applied to the recording surface, the polyolefin resin particle itself is crushed, and the slipperiness of the outermost surface of the ink coating film can be further improved.

The average particle diameter of the polyolefin resin is preferably 76 nm or more, more preferably 150 nm or more, even more preferably 200 nm or more, and even still more preferably from 200 nm to 1 μm.

The polyolefin resin preferably has a melting point or softening point determined by a ring-and-ball method (JIS K 2207) of 110° C. or higher, and more preferably 110 to 150° C., from the viewpoint that the polyolefin resin easily remains as particles on a film fixed to an ink recording surface.

Furthermore, the polyolefin resin preferably has hardness of 1 to more, more preferably hardness of 1 or more, more preferably 2 to 5, according to a penetration method (JIS K 2207).

The polyolefin resin is not particularly limited as long as a state of particles having a predetermined particle diameter can be maintained in a film (a coating film of a recorded image or the like) formed by discharging and landing the ink to a recording surface. For example, a wax and a copolymer thereof produced from an olefin such as ethylene, propylene, butylene, or the like or a derivative thereof, can be used. Specifically, a polyethylene-based wax, a polypropylene-based wax, a polybutylene-based wax, and the like can be used singly or in combination of two or more kinds thereof.

Moreover, as the polyolefin resin, a commercial polyolefin resin can be used, and specific examples thereof include Chemipearl series products such as Chemipearl W4005 (polyethylene-based wax, particle size of 200 nm to 800 nm, softening point of 110° C. (ring-and-ball method), hardness according to a penetration method of 3, solid content of 40%, manufactured by Mitsui Chemicals, Inc.), and the like. In addition, polyolefin resins described in JP-A-2003-201436 can be preferably used.

Copolymerization Resin

From the viewpoint that the copolymerization resin of hydrophobic monomers and hydrophilic monomers satisfies glossiness of a color image, bronzing prevention, and storage stability of the ink at the same time and is capable of forming a color image superior in glossiness, at least one of a styrene-(meth)acrylate resin, a styrene-methylstyrene -(meth)acrylate resin, or a styrene-malate resin, a (meth)acrylate-(meth)acrylate resin, or a styrene-(meth)acrylate-(meth)acrylate resin, and a hydroxyethylated orthophenylphenolacrylate (meth)acrylate resin is preferred.

The copolymer resin is more preferably a resin (styrene-acrylic acid resin) containing a polymer produced by reaction between styrene and acrylic acid or acrylate. The copolymer resin may be an acrylic acid-based water-soluble resin, or a salt of sodium, potassium, ammonium, triethanolamine, triisopropanolamine, triethylamine, diethanolamine, or the like with such a resin.

From the viewpoint of satisfying glossiness of a color image, bronzing prevention, and storage stability of the ink at the same time and being capable of forming a color image having superior glossiness, the acid value of the copolymer resin is preferably from 50 to 320, and more preferably from 100 to 250.

From the viewpoint of satisfying glossiness of a color image, bronzing prevention, and storage stability of the ink at the same time, and being capable of forming a color image further excellent in glossiness, the weight-average molecular weight (Mw) of the copolymer resin is preferably from 2,000 to 30,000, and more preferably from 2,000 to 20,000.

From the viewpoint of satisfying glossiness of a color image, bronzing prevention, and storage stability of the ink at the same time, and being capable of forming a color image further excellent in glossiness, the glass transition temperature (Tg: measured according to JIS K 6900) of the copolymer resin is preferably 30° C. or higher, and more preferably from 50 to 130° C.

The copolymerization resin may be adsorbed on or free from the pigment in the pigment dispersion in some cases, and from the viewpoint of satisfying glossiness of a color image, bronzing prevention, and storage stability of the ink at the same time, and being capable of forming a color image further excellent in glossiness, the maximum particle diameter of the copolymerization resin is preferably 0.3 μm or less, and the average particle diameter is preferably 0.2 μm or less (more preferably 0.1 μm or less).

From the viewpoint of satisfying glossiness of a color image, bronzing prevention, and storage stability of the ink at the same time, and being capable of forming a color image further excellent in glossiness, the content of the copolymerization resin is preferably from 20 to 50 parts by mass, and more preferably from 20 to 40 parts by mass, based on 100 parts by mass of the pigment.

Urethane Resin

With the ink of the present embodiment, it is possible to satisfy glossiness of a color image, bronzing prevention, and storage stability of the ink at the same time and form a color image further excellent in glossiness, by using a urethane resin as a fixing pigment dispersant. The urethane resin is a resin including a polymer obtained by the reaction of a diisocyanate compound with a diol compound, but in the present embodiment, the urethane resin is preferably a resin having any one of a urethane bond and an amide bond, and an acid group.

Examples of the diisocyanate compound include aromatic-alipahtic diisocyanate compounds such as hexamethylene diisocyanate, 2,2,4-trimethylhexamethylene diisocyanate, and the like; aromatic diisocyanate compounds such as tolylene diisocyanate, phenylmethane diisocyanate, and the like; and modified products thereof.

Examples of the diol compound include polyethers such as polyethylene glycol, polypropylene glycol, and the like; polyesters such as polyethylene adipate, polybutylene adipate, and the like; and polycarbonates.

From the viewpoint of satisfying glossiness of a color image, bronzing prevention, and storage stability of the ink at the same time, and being capable of forming a color image further excellent in glossiness, the acid value of the urethane resin is preferably from 10 to 300, and more preferably from 20 to 100. Further, the acid value in the present specification refers to an amount in mg of KOH required for neutralizing 1 g of the resin.

From the viewpoint of satisfying glossiness of a color image, bronzing prevention, and storage stability of the ink at the same time, and being capable of forming a color image further excellent in glossiness, the weight-average molecular weight (Mw) of the urethane resin before the crosslinking is preferably from 100 to 200,000, and more preferably from 1,000 to 50,000. Mw is measured by, for example, GPC (Gel Permeation Chromatography).

From the viewpoint of satisfying glossiness of a color image, bronzing prevention, and storage stability of the ink at the same time, and being capable of forming a color image further excellent in glossiness, the glass transition temperature (Tg: measured according to JIS K 6900) of the urethane resin is preferably −50 to 200° C. and more preferably −50 to 100° C.

The urethane resin has preferably has a carboxyl group.

From the viewpoint of satisfying glossiness of a color image, bronzing prevention, and storage stability of the ink at the same time, and being capable of forming a color image further excellent in glossiness, the content of the urethane resin content is preferably from 20 to 50 parts by mass and more preferably from 20 to 40 parts by mass, based on 100 parts by mass of the pigment.

Fluorene Resin

By using a fluorene resin as a fixing pigment dispersant the ink of the present embodiment, a fluorene resin may be used as a fixing pigment dispersant, the initial viscosity of the ink decreases, the storage stability at high temperatures is improved, and fixability to printing paper becomes excellent.

Furthermore, the fluorene resin is limited in no way as long as it is a resin having a fluorene skeleton. For example, it can be obtained by copolymerizing the monomer units given below.

5-Isocyanato-1-(isocyanatomethyl)-1,3,3-trimethylcyclohexane (CAS No. 4098-71-9)

2,2'-[9H-Fluorene-9-indenebis(4,1-phenyleneoxy)]bisethanol (CAS No. 117344-32-8)

3-Hydroxy-2-(hydroxymethyl)-2-methylpropionic acid (CAS No. 4767-03-7)

N,N-Diethyl-ethanamine (CAS No. 121-44-8)

The fluorene resin is not particularly limited and its monomer constitutional ratio is not limited as long as it is a resin having a fluorene skeleton, but the ratio is preferably as follows: 35 to 45% by mass of 5-isocyanate-1-(isocyanatemethyl)-1,3,3-trimethyl cyclohexane (CAS No. 4098-71-9), 40 to 60% by mass of 2,2'-[9H-fluoren-9-ylidenebis(4,1-phenyleneoxy)]bisethanol (CAS No. 117344-32-8), 5 to 15% by mass of 3-hydroxy-2-(hydroxymethyl)-2-methyl propionic acid (CAS No. 4767-03-7), and 5 to 15% by mass of N,N-diethyl-ethanamine (CAS No. 121-44-8).

The number-average molecular weight (Mn) of the fluorene resin before the crosslinking is preferably 2,000 to 5,000, and more preferably 3,000 to 4,000 from the viewpoints of reduced initial viscosity of the ink and satisfactory storage stability of the ink. Mn is measured by, for example, GPC (Gel Permeation Chromatography).

The fluorene resin may be adsorbed on or free from the pigment in the pigment dispersion in some cases, and from the viewpoint of satisfying glossiness of a color image, bronzing prevention, and storage stability of the ink at the same time, and being capable of forming a color image having superior glossiness, the maximum particle diameter of the resin is preferably 0.3 μm or less, and the average particle diameter of the resin is preferably 0.2 μm or less (more preferably 0.1 μm or less).

From the viewpoint of satisfying glossiness of a color image, bronzing prevention, and storage stability of the ink at the same time, and being capable of forming a color image further excellent in glossiness, the content of the fluorene resin is preferably from 20 to 50 parts by mass, more preferably from 20 to 40 parts by mass, based on 100 parts by mass of the pigment.

The mass ratio (former/latter) of the resin to the fixing pigment dispersant is preferably from 1/2 to 2/1. From the viewpoint of satisfying glossiness of a color image, bronzing prevention, and storage stability of the ink at the same time, and being capable of forming a color image further excellent in glossiness, the mass ratio is more preferably from 1/1.5 to 1.5/1.

From the viewpoint of satisfying glossiness of a color image, bronzing prevention, and storage stability of the ink at the same time, and being capable of forming a color image further excellent in glossiness, the mass ratio (former/latter) of the solid content of the pigment to the solid content of the resin and the fixing pigment dispersant is preferably from 100/40 to 100/100.

Surfactant

In the ink of the present embodiment, a surfactant may be used as the dispersant. Examples of the surfactant include anionic surfactants such as fatty acid salts, higher alkyldicarboxylic acid salts, higher alcohol sulfuric ester salts, higher alkylsulfonic acid salts, condensates of higher fatty acids with amino acids, sulfosuccinic ester salts, naphthenic acid salts, liquid fatty oil sulfuric ester salts, alkylallylsulfonic acid salts, and the like; cationic surfactants such as fatty acid amine salts, quaternary ammonium salts, sulfonium salts, phosphoniums, and the like; and nonionic surfactants such as polyoxyethylene alkyl ethers, polyoxyethylene alkyl esters, sorbitan alkyl esters, polyoxyethylene sorbitan alkyl esters, and the like. Of course, these surfactants, when added to the ink, can also function as a surfactant.

The ink of the present embodiment may be prepared by dispersing and mixing the above components together by means of a suitable method. Preferably, first, a pigment, a polymer dispersant, and water are mixed with each other by an adequate dispersing device (for example, a ball mill, a sand mill, an attritor, a roll mill, an agitator mill, a Henschel mixer, a colloid mill, an ultrasonic homogenizer, a jet mill, an angstrom mill, and the like) to prepare a homogeneous pigment dispersion, and then a resin (resin emulsion) separately prepared, water, a water-soluble organic solvent, a sugar, a pH adjustor, a preservative, a fungicide, and the like are added to be sufficiently dissolved and to thereby prepare an ink solution. After thorough stirring, the mixture is filtered to remove coarse particles and foreign matter that cause clogging to obtain a desired ink. The filtration is preferably conducted with a glass fiber filter as a filter. The glass fiber is preferably resin-impregnated glass fiber from the viewpoint of electrostatic absorption functions. The pore diameter of the glass fiber filter is preferably from 1 to 40 μm, and more preferably from 1 to 10 μm, from the viewpoints of productivity and removal by adsorption of charged free resins or the like. The discharge stability can be improved by sufficient removal by adsorption of the charged free resins or the like. An example of the filter is an Ultipor GF Plus filter manufactured by Pall Corporation.

(Poly)oxyalkylene Glycol

The ink of the present embodiment may also include (poly) oxyalkylene glycol.

In the case where the ink of the present embodiment includes (poly)oxyalkylene glycol, the (poly)oxyalkylene glycol is preferably a water-miscible oligomer obtained by addition polymerization of at least one of ethylene oxide and propylene oxide. More preferably, it is at least one or more selected from the group consisting of ethylene glycol, diethylene glycol, triethylene glycol, propylene glycol, dipropylene glycol, and tripropylene glycol, and even more preferably at least one or more selected from the group consisting of triethylene glycol, propylene glycol, dipropylene glycol, and tripropylene glycol. The (poly)oxyalkylene glycol is still more preferably a water-miscible (poly)propylene glycol.

In the present embodiment, the (poly)oxyalkylene glycol is preferably contained in an amount of 2.0 to 18.0% by mass, and more preferably 6.0 to 18.0% by mass, based on the total mass (100% by mass) of the ink. When the amount of the (poly)oxyalkylene glycol is in the above-described range, the sparingly water-soluble alkanediol can be maintained in the mixed state, not separated in the drying process of ink droplets. In addition, the initial viscosity of the ink does not increase too much, and in the ordinary preservation state of the ink, separation of the oil layer can be prevented effectively, the preservability of the ink is excellent, and the insolubility state is prevented, thus leading to excellent glossiness.

Furthermore, since the (poly)oxyalkylene glycol is not easily dried even at a high temperature and a low humidity, it is advantageous in that the nozzle clogging recoverability can be improved under the open environment of a relative humidity of 15% RH at 50° C.

Moreover, the total content of the (poly)oxyalkylene glycol and the humectant is preferably 12.0% by mass or more and 60.0% by mass or less, and more preferably 30.0% by mass or more and 54.0% by mass or less, based on the total mass (100% by mass) of the ink. When the sum is in the above-described range, the curling is suppressed, on any of various recording media, particularly, an aqueous low-absorbing recording medium, which is thus favorable.

Sugars

In the present embodiment, sugars may be included. Examples of the sugar include monosaccharides, disaccharides, oligosaccharides (including trisaccharides and tetrasaccharides), polysaccharides, and derivatives thereof. Among these, glucose, mannose, fructose, ribose, xylose, arabinose, galactose, glucitol, sorbitol, maltose, cellobiose, lactose, sucrose, trehalose, maltotriose, filanose, raffinose, and the like are preferred. Among these, raffinose is more preferred. By adding raffinose to the ink of the present embodiment, the intermittent printing property is improved.

Further, the polysaccharides refer to sugars in a broad sense and include substances widely distributed throughout nature such as alginic acid, α-cyclodextrin, cellulose, and the like. Examples of the derivatives of these sugars include reduced sugars (for example, sugar alcohols (general formula: $HOCH_2(CHOH)_nCH_2OH$ (wherein n represents an integer of 2 to 5)), oxidized sugars (for example, aldonic acid and uronic acid), amino acids, thiosugars of the above-mentioned sugars, and the like. Among these, sugar alcohols are particularly preferable. Examples thereof include maltitol, sorbitol, xylitol, and the like. Commercially available products may be used as these sugars. For example, HS20, HS30, and HS500 (all manufactured by Hayashibara Shoji Inc.) and Oligo GGF (manufactured by Asahi Kasei Corporation) can be preferably used.

Furthermore, it is thought that the dialkylene glycol and the water-soluble alkanetriol or the sugar also function as a solubilizing agent for the sparingly water-soluble alkanediol.

Penetrant

Moreover, the ink of the present embodiment may further include a penetrant in addition to the components described above. Glycol ethers can be preferably used as the penetrant.

Specific examples of the glycol ethers include ethylene glycol monomethyl ether, ethylene glycol monoethyl ether, ethylene glycol mono-iso-propyl ether, ethylene glycol mono-n-butyl ether, ethylene glycol mono-iso-butyl ether, ethylene glycol mono-tert-butyl ether, ethylene glycol monomethyl ether acetate, diethylene glycol monomethyl ether, diethylene glycol monoethyl ether, diethylene glycol mono-n-propyl ether, diethylene glycol mono-iso-propyl ether, diethylene glycol mono-n-butyl ether, diethylene glycol mono-tert-butyl ether, triethylene glycol mono-n-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-tert-butyl ether, dipropylene glycol monomethyl ether, dipropylene glycol monoethyl ether, dipropylene glycol mono-n-propyl ether, dipropylene glycol-iso-propyl ether, dipropylene glycol mono-n-butyl ether, dipropylene glycol mono-tert-butyl ether, 1-methyl-1-methoxybutanol, and these may be used in a mixture of one or more kind thereof.

Among the glycol ethers above, alkyl ethers of polyhydric alcohols are preferred, and ethylene glycol monoethyl ether, ethylene glycol mono-n-butyl ether, diethylene glycol monomethyl ether, diethylene glycol monoethyl ether, diethylene glycol mono-n-butyl ether, propylene glycol monomethyl ether, propylene glycol monoethyl ether, propylene glycol monobutyl ether, triethylene glycol monomethyl ether, triethylene glycol monoethyl ether, and triethylene glycol mono-n-butyl ether are particularly preferred.

Triethylene glycol monomethyl ether and triethylene glycol mono-n-butyl ether are more preferred.

The amount of the penetrant to be added may be appropriately determined, but it is preferably about 0.1 to 30% by mass, and more preferably about 1 to 20% by mass.

Surfactant

The ink of the present embodiment may include a surfactant. By using a surfactant for a recording medium having a surface coated with a fiber layer for receiving the ink, such as plain paper, blurring can be adjusted, and accordingly, an image expressing excellent fine lines can be realized. In particular, bleeding can be prevented and whitening caused by reflected light generated can be prevented as the amount of the adhering inks increases even when a recording medium, such as printing paper, which has a coating layer provided for receiving oil-based inks on the surface of a receiving layer is used.

A polyorganosiloxane-based surfactant can be preferably used as the surfactant used in the present embodiment. In forming an image to be recorded, the wettability (affinity) to the recording medium surface is increased and the permeability of the ink can be increased. In the case where a polyorganosiloxane-based surfactant is used, the solubility of the surfactant in the ink is improved due to incorporation of one of the above-described sparingly water-soluble alkanediols and one of (poly)alkylene glycols, and generation of the insoluble matter or the like can be suppressed. Thus, an ink having higher discharge stability can be realized.

Commercially available products may be used as the surfactant, and for example, BYK-347 and BYK-348 (both manufactured by BYK Chemie Japan, Inc.), and the like can be used.

As the surfactant used in the present embodiment, the polyorganosiloxane-based surfactant is not particularly limited, but it particularly preferably has a dynamic surface tension of 26 mN/m or less at 1 Hz when prepared in an aqueous solution containing 20% by mass of glycerin, 10% by mass of 1,2-hexanediol, 0.1% by mass of a polyorganosiloxane-based surfactant, and 69.9% by mass of water. The dynamic surface tension can be measured with, for example, a Bubble Pressure Tensiometer BP2 (manufactured by KRUSS GmbH).

Commercially available products may be used as the surfactant, and for example, Olfine PD-501 and Olfine PD-570 (both manufactured by Nissin Chemical Industry Co., Ltd.), or the like can be used.

Moreover, the polyorganosiloxane-based surfactant is a compound represented by the following chemical formula (I):

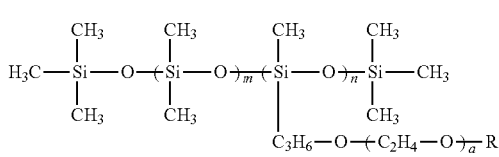

(I)

In the compound of the chemical formula (I), R, a, m, and n preferably have the combinations as below.

First, preferably, R is a hydrogen atom or a methyl group, a is an integer of 2 to 13, m is an integer of 2 to 70, and n is an integer of 1 to 8.

More preferably, R is a hydrogen atom or a methyl group, a is an integer of 2 to 13, m is an integer of 2 to 50, and n is an integer of 1 to 8.

Even more preferably, R is a hydrogen atom or a methyl group, a is an integer of 2 to 13, m is an integer of 2 to 50, and n is an integer of 1 to 5.

Even still more preferably, R is a hydrogen atom or a methyl group, a is an integer of 2 to 11, m is an integer of 2 to 50, and n is an integer of 1 to 5.

Even still more preferably, R is a methyl group, a is an integer of 6 to 18, m is an integer of 0 to 4, and n is 1 or 2.

Even still more preferably, R is a methyl group, a is an integer of 6 to 18, m is 0, and n is 1.

Furthermore, the polyorganosiloxane-based surfactant may include the compounds having favorable combination as described above singly or in combination of two or more kinds thereof. By using such the specific polyorganosiloxane-based surfactants, aggregation unevenness of ink is further suppressed even when printing is carried out on printing paper as a recording medium.

By using the compound of the formula (I) in which R is a methyl group, generation of the beading of the ink can be further suppressed. Further, by using the compound of the formula (I), in which R is a hydrogen atom, in combination, bleeding of the ink can be further suppressed.

A high-quality image having suppressed occurrence of bleeding or beading can be obtained by appropriately adjusting the mixing ratio of the compound of the formula (I) in which R is a methyl group tp the compound of the formula (I) in which R is a hydrogen atom, and the compounds can also serve as adjusters in the case where flowability varies depending on the type of pigment and the amount of the resin.

The surfactant is contained in the ink of the present embodiment (100% by mass) in an amount of preferably 0.01 to 1.0% by mass, and more preferably 0.05 to 0.50% by mass. In particular, when a surfactant in which R is a hydrogen group is used, the content of such a surfactant decreases, as compared to when a surfactant in which R is a methyl group is used, which is favorable for suppression of the occurrence of beading. When 0.01 to 0.1% by mass of a surfactant in which R is a hydrogen group is contained, water repellency is exhibited and bleeding can be adjusted.

To the ink of the present embodiment may be further added another surfactant, specifically, an acetylene glycol surfactant, an anionic surfactant, a nonionic surfactant, an amphoteric surfactant, or the like.

Among these, examples of the acetylene glycol surfactant include 2,4,7,9-tetramethyl-5-decyn-4,7-diol, 3,6-dimethyl-4-octyn-3,6-diol, 3,5-dimethyl-1-hexyn-3-ol, 2,4-dimethyl-5-hexyn-3-ol, and the like. Further, commercially available products may also be used as the acetylene glycol surfactant. Examples thereof include Olfine E1010, STG, and Y (trade names, manufactured by Nissin Chemical Industry Co., Ltd.), Surfynol 61, 104, 82, 465, 485, and TG (trade names, manufactured by Air Products and Chemicals Inc.).

Water and Other Components

The ink of the present embodiment may contain water. As the water, pure water or ultrapure water such as ion exchange water, ultrafiltered water, reverse osmosis water, distilled water, and the like is preferably used. Water that is sterilized by ultraviolet irradiation, hydrogen peroxide addition, or the like is particularly preferable since generation of mold or bacteria can be prevented over a long period of time.

A nozzle clogging-preventing agent such as glycerin and the like, a preservative, an antioxidant, a conductivity adjustor, a pH adjustor, a viscosity adjustor, a surface tension adjustor, an oxygen absorber, and the like may be further to the ink of the present embodiment.

Examples of the preservative and fungicide included in the ink of the present embodiment include sodium benzoate, sodium pentachlorophenol, sodium 2-pyridinethiol-1-oxide, sodium sorbate, sodium dehydroacetate, and 1,2-dibenzinethiazolin-3-one (Proxel CRL, Proxel BND, Proxel GXL, Proxel XL-2, and Proxel TN, all manufactured by ICI), and the like.

Moreover, examples of the pH adjustor, solubilizing agents, and the antioxidants included in the ink of the present embodiment include amines such as diethanolamine, triethanolamine, propanolamine, morpholine, and the like, and modified products thereof; inorganic salts such as potassium hydroxide, sodium hydroxide, lithium hydroxide, and the like; ammonium hydroxide and quaternary ammonium hydroxide (tetramethylammonium or the like); carbonates such as potassium carbonate, sodium carbonate, lithium carbonate, and the like; other phosphates; N-methyl-2-pyrrolidone; ureas such as urea, thiourea, tetramethylurea, and the like; allophanates such as allophanate, methyl allophanate, and the like; biurets such as biuret, dimethyl biuret, tetramethyl biuret, and the like; and L-ascorbic acid and salts thereof.

In addition, the ink of the present embodiment may include an antioxidant and an ultraviolet absorber, and examples of the antioxidant and the ultraviolet absorber include Tinuvin 328, 900, 1130, 384, 292, 123, 144, 622, 770, and 292, Irgacor 252 and 153, and Irganox 1010, 1076, 1035, and MD1024 manufactured by Ciba Specialty Chemicals, and oxides of lanthanides, and the like.

Physical Properties of Ink for Ink Jet Recording

The ink of the present embodiment can exhibit desired effects by controlling the constituent components as well as the physical properties, as described above.

The surface tension of the ink is from 21 to 25 mN/m, and preferably from 22 to 24 mN/m. When the surface tension is in the above-described range, the ink droplets adhering on the recording medium hardly flow, and as a result, blurring, bleeding, and beading at the edge can be suppressed effectively.

Furthermore, the thixotropic index (TI) represented by the following formula (I), as determined at a time point when its content becomes 40% by mass based on the total mass (100% by mass) before the evaporation of the ink by the evaporation of the ink, is from 2 to 110, and preferably from 4 to 110. When the TI is in the above-described range, the flowability after adhering on the recording medium can be suppressed, that is, the pseudoplastic fluid can be thus exhibited on the recording medium. As a result, the clogging recoverability can be excellent, and occurrence of bleeding and beading, and ink blurring at the edge can be all suppressed. Particularly, if the upper limit of TI is 110 or less, the effect of the increase in the ink viscosity in the nozzles by the volatilization of the ink can be reduced.

Furthermore, the initial viscosity of the ink is preferably from 3 to 10 mPa·s, and more preferably from 3 to 6 mPa·s. If the initial viscosity is in the above-described range, the ink can be discharged from the head, thereby providing an ink suitable for the ink jet recording application.

Thus, according to the present embodiment, an ink for ink jet recording, which has excellent clogging recoverability and is capable of suppressing the bleeding and beading, and the ink blurring at the edge at the same time, can be provided.

Recording Medium

The recording medium on which the ink of the present embodiment will be recorded is not particularly limited, and for example, in addition to plain paper or a recording medium including a layer for receiving a water-based ink, even a low-absorbing recording medium can also be suitably used.

Examples of the low-absorbing recording medium include coated paper, and further include recording paper (printing paper) such as lightly coated paper, art paper, coat paper, matte paper, cast paper, and the like.

The coated paper is paper which is obtained by coating a paint on the surface to increase its aesthetic or smooth sense. The paint can be made by mixing a pigment such as talc, pyrophyllite, clay (kaolin), titanium oxide, magnesium carbonate, calcium carbonate, and the like with an adhesive such as starch, polyvinyl alcohol, and the like. The paint is coated using a machine called a coater in the process for preparation of paper. The coater is classified into an on-machine type which is directly connected with a paper machine, thereby serving papermaking and applying as one process, and an off-machine type which there is other process separated from the papermaking. The coater is generally used for recording, and according to the Ministry of Economy, "Vital Statistics Classification Production", classified as coated paper for printing.

The lightly coated paper refers to paper for recording, which has a coating amount of the paint of 12 g/m$^2$ or less. The art paper refers to paper for recording, which is obtained by coating a paint in an amount of approximately 40 g/m$^2$ on high-quality paper for recording (high-quality paper, paper having a rate of chemical pulp to be used of 100%). The coat paper refers to paper for recording, which is obtained by coating a paint in an amount of approximately 20 g/m$^2$ to 40 g/m$^2$. The cast paper refers to paper for recording, which is finished to have more gloss and recording effects by applying pressure on the surface of art paper or coat paper in a machine called a cast drum.

As the low-absorbing recording medium, synthetic paper or printing paper (OKT+, manufactured by Oji Paper Co., Ltd.) is preferably used, but in particular, even when low-resolution printing is carried out on art paper, high-quality paper for print-on-demand (POD) application, or exclusive paper for laser printers, high-quality images free of bleeding or beading can be achieved. Examples of the high-quality paper for POD application include Ricoh Business Coat Gloss 100 (manufactured by Ricoh Company, Ltd.) and the like. Examples of the exclusive paper for laser printers include LPCCTA4 (manufactured by Seiko Epson Corporation) and the like. Further, examples of the waterproof paper include Kareka (manufactured by Mitsubishi Kagaku Media Co., Ltd.), Laser Peach (manufactured by Nisshinbo Postal Chemical Co., Ltd.), and the like.

Ink Set for Ink Jet Recording

The ink set for ink jet recording according to the embodiment of the present invention includes the ink for ink jet recording (pale ink) of the embodiment above, and an ink for ink jet recording (concentrated ink) containing a coloring material at a predetermined concentration. The content of the coloring material is from 5 to 7% by mass, and preferably from 5 to 6% by mass, based on total mass (100% by mass) of the ink.

Thus, an ink set including a predetermined pale ink and a predetermined concentrated ink has excellent clogging recoverability, and can suppress bleeding and beading. In addition, the ink blurring at the edge can also be suppressed, and at the same time, an image expressing more natural and clear gradation of the color can be formed.

EXAMPLES

The embodiments of the present invention will be described in more detail below with reference to Examples, but the present invention is not limited to these Examples.

Components Used

The components used in Examples and Comparative Examples are as follows.

Pigments
   Cyan pigment (C. I. Pigment Blue 15:3)
   Yellow pigment (C. I. Pigment Yellow 74)
   Magenta pigment (C. I. Pigment Violet 19)
   Black pigment (C. I. Pigment Black 7)

Alkanediols
   1,2-Octanediol
   1,2-Hexanediol (Poly)oxyalkylene Glycol
   Dipropylene glycol Clogging-Preventing Agent
   Glycerin Sugars
   HS-500 (reduced starch saccharide, manufactured by Hayashibara Shoji Inc.)

Resin
   Oxidized high-density polyethylene wax emulsion (AQUACER 515 [trade name], manufactured by BYK Chemie Japan, Inc.)
   Urethane resin (copolymer having a weight-average molecular weight of 6,000 and an acid value of 50)
   Sulfonic ester resins (see below)
   Polyolefin resin (Chemipearl W4005 [trade name], manufactured by Mitsui Chemicals, Inc.)
   Fluorene resin (resin including monomers having a fluorene skeleton represented by CAS No. 117344-32-8 at a monomer constitutional proportion of about 50% by mass, weight-average molecular weight of 3,300)
   Styrene-acrylic acid resin (weight-average molecular weight of 1,600, acid value of 150)

Further, it is described that the sulfonic ester resin is prepared by the following method.

The respective following components were placed in a 2-liter beaker and stirred at 100 rpm for 10 minutes to prepare a monomer emulsion.

Ethylenically unsaturated monomer: Methyl methacrylate . . . 348 g (58 parts by mass)
Butyl acrylate . . . 240 g (40 parts by mass)
Acrylic acid . . . 12 g (2 parts by mass)
Reactive emulsifier: 15% aqueous solution of Aqualon KH-10 (trade name, manufactured by Dai-ichi Kogyo Seiyaku Co., Ltd., having a sulfuric ester group and a polyoxyethylene group). 30 g
Chain transfer agent: 2-Ethylhexylthioglycolate . . . 6 g
Water . . . 450 g Next, 520 g of water and 90 g of a 15% aqueous solution of the same reactive emulsifier as described above were placed in a 2-liter separable flask and heated to a temperature of 60° C. under stirring at 180 rpm. Then, 2 g of ammonium persulfate was added thereto, and the temperature of the mixture was raised to 70° C.

The above-obtained monomer emulsion was gradually added to this aqueous solution heated to a temperature of 70° C. while maintaining the polymerization temperature at 75° C. over a period of 3 hours to carry out emulsion polymerization. Thereafter, the polymer solution thus obtained was heated to 80° C., followed by ripening for 1 hour and cooling. Next, the cooled polymer solution was neutralized and adjusted to pH 7.3 by the addition of a 10% aqueous ammonia solution.

The average particle diameter, the lowest film forming temperature, and the weight-average molecular weight (Mw) of the obtained sulfonic ester resin were measured, and as a result, the average particle diameter was 50 nm, the film forming temperature was 15° C., and the weight-average molecular weight (Mw) was 45,000. The average particle diameter was measured with Photal PAR-III (manufactured by Otsuka Electronics Co., Ltd.). The lowest film forming temperature was measured with a lowest film forming temperature tester (manufactured by Rigaku Industrial Corporation). Further, the weight-average molecular weight was measured with a GPC apparatus (SC8010 (GPC) [trade name], manufactured by Tosoh Corporation) using a calibration curve of standard polystyrene. The measuring conditions were as follows:

Eluent: tetrahydrofuran
Column: G4000HXL (manufactured by Tosoh Corporation)
Flow rate: 1,000 μL/min
Column temperature: 40° C.

Surfactant

Polyorganosiloxane-based surfactant

The polyorganosiloxane-based surfactant used in each of Examples and Comparative Examples is a surfactant including the compound of in the formula (I), in which R is a methyl group, a is an integer of 9 to 13, m is an integer of 2 to 4, and n is an integer of 1 to 2, and a compound of in the formula (I), in which R is a hydrogen atom, a is an integer of 7 to 11, m is an integer of 30 to 50, and n is an integer of 3 to 5.

Furthermore, the polyorganosiloxane-based surfactant was prepared in an aqueous solution containing 20% by mass of glycerin, 10% by mass of 1,2-hexanediol, 0.1% by mass of the surfactant, and 69.9% by mass of water. In particular, when the dynamic surface tension at 1 Hz (=One bubble per second) was measured with a Bubble Pressure Tensiometer BP2 (manufactured by KRUSS GmbH), the dynamic surface tension of the aqueous solution at 1 Hz was 24.6 mN/m.

Here, in the Table 1 below, "yellow" indicates the concentration ratio of a mixture of C. I. Pigment Yellow 74 and C. I. Pigment Yellow 129 at 3:1. Further, "magenta" indicates C. I. Pigment Violet 19.

Further, in the Tables 1 to 5 below, the numerical values described in the columns of sugars and resins are values as denoted in terms of solid content amounts.

Measurement Items

Initial Viscosity

The viscosity of each ink at a shear rate of $250\ s^{-1}$ was measured using a dynamic viscoelasticity measuring apparatus HAAKE MARS II (rheometer).

Preparation of Sample for Measurement of TI

The ink was stirred while maintaining the temperature at 65 to 75° C., and the solvent components contained in the ink were volatilized to 40% by mass relative to the mass of the initial ink (ink before the evaporation), thereby preparing a sample for measurement.

Further, the reason why the ink after volatilization of the solvent components was used as a sample for measurement is as follows. Since the ink droplets adhering on a recording medium in the actual printing are about 1 to 100 picoliters, that is, are very small, the solvent components are easily volatilized. For this reason, in the case where the ink droplets in the actual printing are used as samples for measurement, the ink droplets cause the change in viscosity accompanied by the drying behavior, which makes accurate measurement difficult. Therefore, by carrying out measurement using the resultant after the volatilization of the solvent components included in the ink as alternative samples for measurement, the TI of the ink droplets can be measured accurately.

TI

For the samples for measurement thus prepared, the viscosity of each ink at shear rates of $1\ s^{-1}$ and $1000\ s^{-1}$ was measured in the same manner as for the initial viscosity, and TI was calculated from "viscosity at a shear rate of $1\ s^{-1}$/ viscosity at a shear rate of $1000\ s^{-1}$".

Furthermore, when the shear rate is less than $1\ s^{-1}$, the upper limit of the apparatus is stable, and thus cannot be taken. When the shear rate is more than $1000\ s^{-1}$, the ink overflows from the measurement plate by the centrifugal force.

Surface Tension

The surface tension of each ink was measured using an Automatic Surface Tensiometer CBVP-Z (manufactured by Kyowa Interface Science Co., Ltd.) by a Wilhelmy method.

Dot Diameter

The dot diameter was measured using a MEASURING MICROSCOPE STM-UM (measured by Olympus Corporation) at a magnification rate of 200.

TABLE 1

| | | Example | | | | | | | | | |
|---|---|---|---|---|---|---|---|---|---|---|---|
| Types | Names of components | 1 | 2 | 3 | 4 | 5 | 6 | 7 | 8 | 9 | 10 |
| Pigment | Cyan | 3.00 | 3.00 | — | — | — | — | — | — | — | — |
| | Yellow | — | — | 3.00 | 3.00 | — | — | — | — | — | — |
| | Magenta | — | — | — | — | 3.00 | 3.00 | 3.00 | — | — | — |
| | Black | — | — | — | — | — | — | — | 3.00 | 3.00 | 3.00 |
| Alkanediol | 1,2-Octanediol | 3.30 | 3.20 | 3.30 | 3.30 | 3.00 | 2.70 | 2.20 | 2.80 | 3.30 | 2.50 |
| | 1,2-Hexanediol | 1.00 | 1.00 | 1.00 | 1.00 | 1.00 | 1.00 | 1.00 | 1.00 | 1.00 | 1.00 |
| POAG | Dipropylene glycol | 5.00 | 5.00 | 5.00 | 4.00 | 5.00 | 5.00 | 5.00 | 5.00 | 5.00 | 5.00 |
| Clogging-preventing agent | Glycerin | 3.00 | 3.00 | 3.00 | 2.12 | 6.00 | 6.00 | 6.00 | 6.00 | 1.46 | 6.00 |
| Sugars | HS-500 | 2.10 | 2.10 | 0.70 | — | 2.10 | 2.10 | 2.10 | 2.80 | 2.10 | 2.10 |

TABLE 1-continued

| Types | Names of components | Example 1 | 2 | 3 | 4 | 5 | 6 | 7 | 8 | 9 | 10 |
|---|---|---|---|---|---|---|---|---|---|---|---|
| Resin | AQ515 | 2.00 | — | 2.00 | — | 4.00 | — | — | 2.00 | — | — |
|  | Urethane resin | — | 2.25 | — | 6.25 | — | 2.25 | — | — | 3.75 | — |
|  | Sulfonic ester resin | — | — | — | — | — | — | 6.00 | — | — | 6.00 |
|  | Polyolefin resin | 0.60 | 0.60 | 0.60 | 0.60 | 0.60 | 0.60 | 0.60 | 0.60 | 0.60 | 0.60 |
|  | Fluorene resin | 0.60 | 0.60 | 0.60 | 0.60 | 0.60 | 0.60 | 0.60 | 0.90 | 0.90 | 0.90 |
|  | Styrene-acrylic acid resin | 0.60 | 0.60 | 0.60 | 0.60 | 0.60 | 0.60 | 0.60 | 1.20 | 1.20 | 1.20 |
| Surfactant | Polyorganosiloxane-based | 0.20 | 0.20 | 0.20 | 0.20 | 0.20 | 0.20 | 0.20 | 0.20 | 0.20 | 0.20 |
|  | Water | Balance | Balance | Balance | Balance | Balance | Balance | Balance | Balance | Balance | Balance |
|  | Total | 100.00 | 100.00 | 100.00 | 100.00 | 100.00 | 100.00 | 100.00 | 100.00 | 100.00 | 100.00 |
| Measurement | Initial viscosity [mPa·s] | 4.0 | 3.8 | 3.9 | 3.5 | 4.2 | 3.8 | 3.7 | 3.9 | 3.8 | 4.0 |
|  | TI | 4.1 | 6.9 | 4.0 | 2.9 | 2.7 | 6.7 | 3.8 | 8.0 | 5.2 | 2.0 |
|  | Surface tension [mN/m] | 23.1 | 22.7 | 23.3 | 23.5 | 23.3 | 23.1 | 23.4 | 22.7 | 22.5 | 23.1 |
|  | Dot diameter [μm] | 80.0 | 70.2 | 72.6 | 78.6 | 73.9 | 72.7 | 64.3 | 65.5 | 65.4 | 57.9 |

TABLE 2

| Types | Names of components | Comparative Example 1 | 2 | 3 | 4 | 5 | 6 | 7 | 8 | 9 | 10 |
|---|---|---|---|---|---|---|---|---|---|---|---|
| Pigment | Cyan | 3.00 | 3.00 | 3.00 | — | — | — | — | — | — | — |
|  | Yellow | — | — | — | 3.00 | 3.00 | 3.00 | — | — | — | — |
|  | Magenta | — | — | — | — | — | — | 3.00 | 3.00 | — | — |
|  | Black | — | — | — | — | — | — | — | — | 3.00 | 3.00 |
| Alkanediol | 1,2-Octanediol | — | 1.50 | 2.50 | — | 1.50 | 2.50 | — | 1.00 | — | 1.50 |
|  | 1,2-Hexanediol | 1.00 | 1.00 | 1.00 | 1.00 | 1.00 | 1.00 | 1.00 | 1.00 | 1.00 | 1.00 |
| POAG | Dipropylene glycol | 5.00 | 5.00 | 5.00 | 5.00 | 5.00 | 5.00 | 5.00 | 5.00 | 5.00 | 5.00 |
| Clogging-preventing agent | Glycerin | 3.00 | 3.00 | 3.00 | 3.00 | 3.00 | 3.00 | 3.00 | 6.00 | 3.00 | 6.00 |
| Sugars | HS-500 | 2.10 | 12.60 | 2.10 | 0.70 | 12.60 | 2.10 | 0.70 | 12.60 | — | 10.50 |
| Resin | AQ515 | 2.00 | — | — | — | 2.00 | — | 4.00 | — | 2.00 | — |
|  | Urethane resin | — | — | — | — | — | — | — | — | — | — |
|  | Sulfonic ester resin | — | — | 6.00 | — | — | 6.00 | — | — | — | — |
|  | Polyolefin resin | 0.60 | 0.60 | 0.60 | 0.60 | 0.60 | 0.60 | 0.60 | 0.60 | 0.60 | 0.60 |
|  | Fluorene resin | 0.60 | 0.60 | 0.60 | 0.60 | 0.60 | 0.60 | 0.60 | 0.60 | 0.90 | 0.90 |
|  | Styrene-acrylic acid resin | 0.60 | 0.60 | 0.60 | 0.60 | 0.60 | 0.60 | 0.60 | 0.60 | 1.20 | 1.20 |
| Surfactant | Polyorganosiloxane-based | 0.20 | 0.20 | 0.20 | 0.20 | 0.20 | 0.20 | 0.20 | 0.20 | 0.20 | 0.20 |
|  | Water | Balance | Balance | Balance | Balance | Balance | Balance | Balance | Balance | Balance | Balance |
|  | Total | 100.00 | 100.00 | 100.00 | 100.00 | 100.00 | 100.00 | 100.00 | 100.00 | 100.00 | 100.00 |
| Measurement | Initial viscosity [mPa·s] | 3.5 | 3.7 | 3.5 | 3.4 | 3.7 | 3.6 | 3.4 | 3.9 | 3.5 | 3.8 |
|  | TI | 1.3 | 1.3 | 1.3 | 1.4 | 1.4 | 1.6 | 1.7 | 1.8 | 1.3 | 1.3 |
|  | Surface tension [mN/m] | 34.0 | 23.0 | 23.0 | 33.7 | 24.1 | 23.6 | 33.2 | 23.3 | 32.6 | 22.5 |
|  | Dot diameter [μm] | 49.3 | 87.1 | 72.4 | 49.0 | 81.6 | 68.7 | 52.2 | 66.6 | 56.5 | 66.3 |

TABLE 3

| Types | Names of components | Example 11 | 12 | 13 | 14 | 15 | 16 | 17 |
|---|---|---|---|---|---|---|---|---|
| Pigment | Cyan | 3.00 | 3.00 | 3.00 | 3.00 | 3.00 | 3.00 | 3.00 |
| Alkanediol | 1,2-Octanediol | 4.60 | 4.20 | 3.80 | 3.00 | 3.00 | 4.60 | 3.00 |
|  | 1,2-Hexanediol | 1.00 | 1.00 | 1.00 | 1.00 | 1.00 | 1.00 | 1.00 |
| POAG | Dipropylene glycol | 5.00 | 5.00 | 5.00 | 5.00 | 5.00 | 5.00 | 5.00 |
| Clogging-preventing agent | Glycerin | 2.14 | 2.14 | 2.14 | 2.14 | 2.14 | 2.14 | 2.14 |
| Sugars | HS-500 | 2.10 | 2.10 | 2.10 | 2.10 | 14.00 | 11.90 | 7.00 |
| Resin | AQ515 | 6.00 | 4.50 | 3.00 | 0.60 | 0.60 | 6.00 | 0.60 |
|  | Urethane resin | — | — | — | — | — | — | — |
|  | Sulfonic ester resin | — | — | — | — | — | — | — |
|  | Polyolefin resin | 0.60 | 0.60 | 0.60 | 0.60 | 0.60 | 0.60 | 0.60 |
|  | Styrene-acrylic acid resin | 0.60 | 0.60 | 0.60 | 0.60 | 0.60 | 0.60 | 0.60 |
| Surfactant | Polyorganosiloxane-based | 0.20 | 0.20 | 0.20 | 0.20 | 0.20 | 0.20 | 0.20 |

TABLE 3-continued

| | | Example | | | | | | |
|---|---|---|---|---|---|---|---|---|
| Types | Names of components | 11 | 12 | 13 | 14 | 15 | 16 | 17 |
| | Water | Balance | Balance | Balance | Balance | Balance | Balance | Balance |
| Measurement | Total | 100.00 | 100.00 | 100.00 | 100.00 | 100.00 | 100.00 | 100.00 |
| | Initial viscosity [mPa·s] | 6.0 | 5.1 | 4.3 | 3.5 | 10.5 | 10.1 | 7.8 |
| | TI | 107.8 | 42.6 | 6.1 | 2.8 | 24 | 98.0 | 2.5 |
| | Surface tension [mN/m] | 23.6 | 23.3 | 23.4 | 23.3 | 23.3 | 23.6 | 23.2 |
| | Dot diameter [μm] | 62.3 | 70.0 | 76.5 | 83.1 | 85.5 | 68.9 | 84.4 |

TABLE 4

| | | Example | | | | | | | |
|---|---|---|---|---|---|---|---|---|---|
| Types | Names of components | 11 | 12 | 13 | 14 | 15 | 16 | 17 | 18 |
| Pigment | Cyan | 1.00 | 1.00 | 4.00 | 3.00 | 2.00 | 0.50 | 3.00 | 3.00 |
| Alkanediol | 1,2-Octanediol | 5.00 | 5.00 | 5.00 | 5.00 | 5.00 | 5.00 | 5.00 | 5.00 |
| | 1,2-Hexanediol | 0.81 | 0.81 | 1.09 | 1.00 | 0.91 | 0.77 | 1.00 | 1.00 |
| POAG | Dipropylene glycol | 5.00 | 5.00 | 5.00 | 5.00 | 5.00 | 5.00 | 5.00 | 5.00 |
| Clogging-preventing agent | Glycerin | 0.71 | 0.71 | 2.85 | 2.14 | 1.43 | 0.36 | 2.14 | 2.14 |
| Sugars | HS-500 | — | — | — | — | — | — | — | — |
| Resin | AQ515 | 7.50 | 25.00 | 7.50 | 7.50 | 7.50 | 7.50 | 7.50 | 6.75 |
| | Urethane resin | — | — | — | — | — | — | — | — |
| | Sulfonic ester resin | — | — | — | — | — | — | — | — |
| | Polyolefin resin | 0.60 | 0.60 | 0.60 | 0.60 | 0.60 | 0.60 | 0.60 | 0.60 |
| | Styrene-acrylic acid resin | 0.20 | 0.20 | 0.80 | 0.60 | 0.40 | 0.10 | 0.60 | 0.60 |
| | Fluorene resin | 0.20 | 0.20 | 0.80 | 0.60 | 0.40 | 0.10 | 0.60 | 0.60 |
| Surfactant | Polyorganosiloxane-based | 0.20 | 0.20 | 0.20 | 0.20 | 0.20 | 0.20 | 0.20 | 0.20 |
| | Water | Balance | Balance | Balance | Balance | Balance | Balance | Balance | Balance |
| Measurement | Total | 100.00 | 100.00 | 100.00 | 100.00 | 100.00 | 100.00 | 100.00 | 100.00 |
| | Initial viscosity [mPa·s] | 6.3 | 6.0 | 8.6 | 7.2 | 6.7 | 6.1 | 18.9 | 7.1 |
| | TI | 170.0 | 118.0 | Not measured (200>) | 214.7 | 196.8 | 177.9 | Not measured (200>) | 158.0 |
| | Surface tension [mN/m] | 23.2 | 23.2 | 23.4 | 23.4 | 23.2 | 23.0 | 23.2 | 23.3 |
| | Dot diameter [μm] | 60.6 | 64.2 | 58.3 | 58.5 | 59.1 | 62.2 | Not discharged | 61.8 |

TABLE 5

| | | Comparative Example | | | |
|---|---|---|---|---|---|
| Types | Names of components | 19 | 20 | 21 | 22 |
| Pigment | Cyan | 6.00 | — | — | — |
| | Yellow | — | 6.00 | — | — |
| | Magenta | — | — | 6.00 | — |
| | Black | — | — | — | 6.00 |
| Alkanediol | 1,2-Octanediol | 2.50 | 2.50 | 1.70 | 2.00 |
| | 1,2-Hexanediol | 1.00 | 1.00 | 0.64 | 1.00 |
| POAG | Dipropylene glycol | 5.00 | 2.50 | 7.00 | 5.00 |
| Clogging-preventing agent | Glycerin | 3.30 | 4.25 | 7.00 | 3.00 |
| Sugars | HS-500 | — | — | — | — |
| Resin | AQ515 | — | — | — | — |
| | Urethane resin | — | — | — | — |
| | Sulfonic ester resin | — | — | — | — |
| | Polyolefin resin | — | — | — | — |
| | Fluorene resin | 1.20 | 1.20 | 1.20 | 1.80 |
| | Styrene-acrylic acid resin | 1.20 | 1.20 | 1.20 | 2.40 |
| Surfactant | Polyorganosiloxane-based | 0.20 | 0.20 | 0.20 | 0.20 |
| | Water | Balance | Balance | Balance | Balance |
| | Total | 100.00 | 100.00 | 100.00 | 100.00 |
| Measurement | Initial viscosity [mPa·s] | 3.2 | 3.7 | 3.5 | 3.7 |
| | Surface tension [mN/m] | 23.1 | 23.6 | 23.1 | 23.6 |
| | TI | 1.2 | 1.9 | 6.9 | 1.3 |
| | Dot diameter [μm] | 78.6 | 71.5 | 68.1 | 61.3 |

Evaluation Items

Evaluation of Clogging Recoverability

The ink prepared above was charged and loaded into an ink cartridge of an ink jet printer (PX-G930 manufactured by Seiko Epson Corporation). Then, the ink was charged in a printer head using a printer driver, and it was confirmed that normal recording could be conducted. Further, the carriage was moved to an ink cartridge replacement position, and the printer was then unplugged. The ink cartridge and then the printer head were removed. In this way, the printer head from which the ink cartridge and the head cap were removed was left to stand under the environment of 40° C. and a humidity of 15% for one day.

After standing, the printer head left in the carriage was loaded as before, the ink cartridge which had been left under the environment of normal temperature and normal humidity was reloaded therein, and a cleaning operation was repeated until all nozzles ejected inks in the same manner as the initial stage. The recoverability was evaluated according to the following evaluation criteria.

A: Clogging was recovered after 6 times repetition of the cleaning operation.
B: Clogging was recovered after 12 times repetition of the cleaning operation.
C: Clogging was not recovered even after 12 times repetition of the cleaning operation.

Evaluation of Occurrence of Bleeding

The ink prepared above was charged into an ink cartridge of an ink jet printer (PX-G930 manufactured by Seiko Epson Corporation) so that recording could be conducted at 720 dpi in a main scanning (head driving) direction and at 360 dpi in a sub-scanning (recording medium feeding) direction. Then the voltage applied to piezoelectric elements of the printer head was adjusted so that the dot size at the time of landing was about 7 ng. A 720×720 dpi solid image was recorded on OKT+ (manufactured by Oji Paper Co., Ltd.) having a weight of about 128 g/m² at 720×360 dpi per drive. Recording was conducted under the environment of normal temperature and normal humidity (25° C., humidity 45%). At this time, the amount of the monochromic ink adhered at a 100% Duty was about 3.6 mg/inch².

The recorded image was an image in which 2 to 8 pixel ruled lines of a 80% Duty primary color was brought into contact with a 80% Duty primary color.

The resulting image was evaluated according to the following criteria.

A: 6/720 inch ruled lines were reproduced without bleeding but 4/720 inch ruled lines were not reproduced due to bleeding.
B: 8/720 inch ruled lines were reproduced without bleeding but 6/720 inch ruled lines were not reproduced due to bleeding.
C: 8/720 inch ruled lines were not reproduced due to bleeding.

Evaluation of Occurrence of Beading

The ink obtained above was loaded into an ink cartridge of an ink jet printer (PX-G930 manufactured by Seiko Epson Corporation).

The voltage applied to piezoelectric elements of the printer head was adjusted so that the dot size at the time of landing was about 7 ng, and the dot interval by one main scanning was set to 720×360 dpi. Thus, an image was formed by coating the ink at a resolution of 720×720 dpi on OKT+ (manufactured by Oji Paper Co., Ltd.) having a weight of 128 g/m² at 360× 720 dpi. At this time, the amount of the monochromic ink adhered at a 100% Duty was about 3.6 mg/inch².

The recording of the image was evaluated under the environment of 25° C. and 45% RH.

The resulting image was evaluated according to the following criteria.

A: Up to a 100% Duty, the image was reproduced without beading.
B: Up to a 80% duty, the image was reproduced without beading.
C: With a 80% duty, the image could not be reproduced without beading.

TABLE 6

| Evaluation Items | Example | | | | | | | | | |
|---|---|---|---|---|---|---|---|---|---|---|
| | 1 | 2 | 3 | 4 | 5 | 6 | 7 | 8 | 9 | 10 |
| Clogging recoverability | A | A | A | A | A | A | A | A | A | A |

TABLE 6-continued

| Evaluation Items | Example | | | | | | | | | |
|---|---|---|---|---|---|---|---|---|---|---|
| | 1 | 2 | 3 | 4 | 5 | 6 | 7 | 8 | 9 | 10 |
| Beading | A | A | A | B | B | A | B | A | A | B |
| Bleeding | A | A | A | B | B | A | B | A | B | B |

TABLE 7

| Evaluation Items | Comparative Example | | | | | | | | | |
|---|---|---|---|---|---|---|---|---|---|---|
| | 1 | 2 | 3 | 4 | 5 | 6 | 7 | 8 | 9 | 10 |
| Clogging recoverability | A | A | A | A | A | A | A | A | A | A |
| Beading | C | C | C | C | C | B | C | C | C | C |
| Bleeding | C | C | C | C | C | C | C | C | C | C |

TABLE 8

| Evaluation Items | Example | | | | | | |
|---|---|---|---|---|---|---|---|
| | 11 | 12 | 13 | 14 | 15 | 16 | 17 |
| Clogging recoverability | A | A | A | A | A | A | A |
| Beading | A | A | A | B | B | B | B |
| Bleeding | A | A | A | A | B | A | A |

TABLE 9

| Evaluation Items | Comparative Example | | | | | | | |
|---|---|---|---|---|---|---|---|---|
| | 11 | 12 | 13 | 14 | 15 | 16 | 17 | 18 |
| Clogging recoverability | C | C | C | C | C | C | — | C |
| Beading | A | A | A | A | A | A | — | A |
| Bleeding | A | A | A | A | A | A | — | A |

TABLE 10

| Evaluation Items | Comparative Example | | | |
|---|---|---|---|---|
| | 19 | 20 | 21 | 22 |
| Clogging recoverability | A | A | A | A |
| Beading | A | A | A | B |
| Bleeding | — | — | — | — |

It was confirmed that with the ink for ink jet recording, which includes a sparingly water-soluble alkanediol, a resin, and a coloring material having a predetermined concentration, and has a surface tension of 21 to 25 mN/m and a thixotropic index (TI) represented by the following formula (1) of 2 to 110, the clogging recoverability is excellent, and occurrence of any of bleeding and beading can be suppressed.

What is claimed is:
1. An ink for ink jet recording comprising:
a sparingly water-soluble alkanediol;
a resin; and
a coloring material,
wherein a content of the coloring material is from 1 to 3% by mass based on a total mass of the ink,
a surface tension of the ink is from 21 to 25 mN/m, a solubility of the sparingly water-soluble alkanediol in water is less than 1.0 g/100 g of water, and a thixotropic index (TI) of the ink, calculated by the formula $TI=\eta(1\ s^{-1})/\eta(1000\ s^{-1})$ and determined at a time point when the ink evaporates to 40% by mass of the total mass of the ink before evaporation of the ink, is from 2 to 110.

2. The ink for ink jet recording according to claim 1, wherein the thixotropic index is from 4 to 110.

3. The ink for ink jet recording according to claim 1, wherein. the resin. is at least one of a polyolefin resin and a urethane resin.

4. The ink for ink jet recording according to claim 1, wherein an initial viscosity is 3 to 10 mPa·s.

5. An ink set for ink jet recording comprising:
the ink for ink jet recording according to claim 1; and
an ink for ink jet recording containing a coloring material, wherein the content of the coloring material is from 5 to 7% by mass based on the total mass of the ink.

6. An ink set for ink jet recording comprising:
the ink for ink jet recording according to claim 2; and
an ink for ink jet recording containing a coloring material, wherein the content of the coloring material is from 5 to 7% by mass based on the total mass of the ink.

7. An ink set for ink jet recording comprising:
the ink for ink jet recording according to claim 3; and
an ink for ink jet recording containing a coloring material, wherein the content of the coloring material is from 5 to 7% by mass based on the total mass of the ink.

8. An ink set for ink jet recording comprising:
the ink for ink jet recording according to claim 4; and
an ink for ink jet recording containing a coloring material, wherein the content of the coloring material is from 5 to 7% by mass based on the total mass of the ink.

* * * * *